US010055978B2

(12) United States Patent
Ham et al.

(10) Patent No.: US 10,055,978 B2
(45) Date of Patent: Aug. 21, 2018

(54) APPARATUS FOR IDENTIFYING DEVICE AND METHOD FOR CONTROLLING SAME

(71) Applicant: LG ELECTRONICS INC., Seoul (KR)

(72) Inventors: Junseok Ham, Seoul (KR); Sungyup Kim, Seoul (KR); Yoonseong Kim, Seoul (KR); Youngsu Park, Seoul (KR); Yoonho Shin, Seoul (KR); Sungjae Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/513,966

(22) PCT Filed: Sep. 25, 2014

(86) PCT No.: PCT/KR2014/008977
§ 371 (c)(1),
(2) Date: Mar. 23, 2017

(87) PCT Pub. No.: WO2016/047826
PCT Pub. Date: Mar. 31, 2016

(65) Prior Publication Data
US 2017/0278384 A1    Sep. 28, 2017

(51) Int. Cl.
*G08C 17/02* (2006.01)
*H04B 1/40* (2015.01)
*H04Q 9/00* (2006.01)

(52) U.S. Cl.
CPC .............. *G08C 17/02* (2013.01); *H04B 1/40* (2013.01); *G08C 2201/30* (2013.01); *H04Q 9/00* (2013.01)

(58) Field of Classification Search
CPC . H04Q 9/00; H04B 1/40; G11B 33/10; G11B 31/00; H04M 11/00; G08C 17/02; G08C 2201/30
See application file for complete search history.

(56) References Cited

U.S. PATENT DOCUMENTS 8,897,897 B2 * 11/2014 Demskie .............. H04N 5/4403
340/12.28
9,449,500 B2 * 9/2016 Arling ..................... G08C 17/02
(Continued)

FOREIGN PATENT DOCUMENTS

JP      06-052664       2/1994
JP      2011250054      12/2011
(Continued)

OTHER PUBLICATIONS

Partial Computer English Translation of JP06-052664 (Kurita); Feb. 25, 1994; pp. 1-6.*
(Continued)

*Primary Examiner* — Brian Miller
(74) *Attorney, Agent, or Firm* — Lee, Hong, Degerman, Kang & Waimey

(57) ABSTRACT

The present invention relates to an apparatus for recognizing an adjacent peripheral device and a method for controlling the same. The apparatus comprises: a memory that stores power codes and operating codes that correspond to a plurality of different devices; a communication unit that transmits at least one of the power codes and the operating codes to a target device; a detection unit that detects a change of the state of the target device that has received the transmitted power code or operating code; and a controller that sequentially transmits the plurality of power codes to the target device; identifies the target device as a device that corresponds to the power codes transmitted to the target device in cases where the target device is turned on; and (Continued)

transmits one or more operating codes to the target device and identifies the target device based on at least one operating code that drives the target device among the transmitted operating codes in cases where a plurality of devices correspond to the power codes.

20 Claims, 7 Drawing Sheets

(56) References Cited

U.S. PATENT DOCUMENTS

| | | | |
|---|---|---|---|
| 9,691,272 B2* | 6/2017 | Hou | H04L 67/125 |
| 2015/0010167 A1* | 1/2015 | Arling | H04N 21/42226 |
| | | | 381/105 |
| 2016/0227150 A1* | 8/2016 | Sun | G06F 3/011 |
| 2017/0024999 A1* | 1/2017 | Hayes | G08C 19/28 |
| 2017/0126420 A1* | 5/2017 | Zhang | G06F 1/1698 |
| 2017/0323559 A1* | 11/2017 | Mi | G08C 23/04 |

FOREIGN PATENT DOCUMENTS

| | | |
|---|---|---|
| JP | 2013255107 | 12/2013 |
| KR | 1019970009707 | 6/1997 |
| KR | 10-2007-0041150 | 4/2007 |

OTHER PUBLICATIONS

PCT International Application No. PCT/KR2014/008977, International Search Report dated Jun. 10, 2015, 4 pages.

* cited by examiner (a)

(b)

(a)

(b)

APPARATUS FOR IDENTIFYING DEVICE AND METHOD FOR CONTROLLING SAME

CROSS-REFERENCE TO RELATED APPLICATIONS

This application is the National Stage filing under 35 U.S.C. 371 of International Application No. PCT/KR2014/008977, filed on Sep. 25, 2014, the contents of which are all hereby incorporated by reference herein in its entirety.

TECHNICAL FIELD

The present disclosure relates to an apparatus for identifying an adjacent peripheral device and a method for controlling the same.

BACKGROUND ART

As Information Age has rapidly advanced, various functions may be provided to mobile terminals carried by users. For example, currently, mobile terminals may be implemented as multimedia players having complex functions such as capturing an image or video, playing music or a video file, receiving broadcasting, and the like.

As an example of such various functions, a remote controller function may be provided, allowing a user to use a mobile terminal carried along by himself or herself to remotely control an adjacent device, just like a remote controller. In this case, the mobile terminal may transmit a plurality of operation codes corresponding to a target device that the user wants to operate, to the target device, whereby a function desired by the user may be driven in the target device.

In order to execute such a function, however, the mobile terminal of the user should previously identify the target device. This is because, operations codes of devices are different according to types of the target devices or manufacturers. However, in actuality, it is difficult for a mobile terminal to include information regarding every device that a user wants to operate, and thus, although a user wants to control a specific device through a mobile terminal, if the specific device is not a device which has already been known by the user or if the specific device has not been manufactured by the same manufacturer as that of the mobile terminal, the mobile terminal may not be used as a remote controller although the mobile terminal has a remote controller function.

DISCLOSURE OF THE INVENTION

An aspect of the present disclosure is to solve the aforementioned problem and other problems.

Another aspect of the present disclosure provides a device identifying apparatus capable of providing identification information of a target device to a mobile terminal of a user such that the user may operate the target device through the mobile terminal although the user does not know the target device or although the target device has not been manufactured by the same maker as that of the mobile terminal, and a method for controlling the same.

Another aspect of the present disclosure provides a device identifying apparatus capable of allowing a user to remotely operate a target device through a mobile terminal although the mobile terminal does not include an operation code and identification information regarding the target device, and a method for controlling the same.

According to an aspect of the present invention, a device identifying apparatus includes: a memory storing a power code and operation codes corresponding to a plurality of different devices; a communication unit transmitting at least one of the power code and an operation code to a target device; a sensing unit sensing a change in a state of the target device which has received the transmitted power code or the operation code; and a controller sequentially transmitting the plurality of power codes to the target device, identifying the target device as a device that corresponds to the power code transmitted to the target device when the target device is turned on, transmitting at least one operation code to the target device and identifying the target device on the basis of at least one operation code that drives the target device among the transmitted operation codes in cases where a plurality of devices correspond to the power code.

In an embodiment, the communication unit may receive a signal output from the target device in response to the operation code, and the controller may determine whether the target device is driven by the currently transmitted operation code on the basis of the received signal.

In an embodiment, the signal received from the target device may be a signal indicating that the target device is currently driven according to the currently transmitted operation code.

In an embodiment, the signal received from the target device may be a signal indicating whether the currently transmitted operation code matches an operation code previously set in the target device.

In an embodiment, the sensing unit may include at least one of an electromagnetic field (EMF) sensor, a sound sensor, an optical sensor, a vibration sensor, and a motion sensor, and when the power code is transmitted to the target device, the controller may determine whether the target device is turned on on the basis of at least one of electromagnetic waves generated by the target device, an LED provided in the target device, image information displayed on a display unit of the target device, and movement of the target device.

In an embodiment, when the operation code is transmitted to the target device, the controller may sense at least one of electromagnetic waves generated by the target device, an LED provided in the target device, a change in image information displayed on a display unit, a sound, movement of the target device to determine whether the target device is driven by the operation code.

In an embodiment, when the target device is turned on, the controller may sequentially transmit to the target device operation codes corresponding to functions of devices corresponding to the power code transmitted to the target device among operation codes stored in the memory.

In an embodiment, when the target device is turned on and there is no device corresponding to the power code transmitted to the target device, the controller may identify the target device as a device corresponding to the currently transmitted power code.

In an embodiment, when the target device is driven by the transmitted operation code, the controller may transmit to the target device different operation codes corresponding to devices corresponding to an operation code transmitted to the target device among operation codes stored in the memory.

In an embodiment, when driving of the target device is sensed and there is no other device corresponding to at least one operation code transmitted to the target device, the controller may identify the target device as a device corresponding to the currently transmitted operation code.

In an embodiment, the controller may classify operation codes corresponding to a plurality of devices stored in the memory into operation codes related to a software function and hardware function, and when a plurality of devices correspond to the power code, the controller may transmit to the target device at least one of operation codes related to the hardware function among operation codes of a plurality of devices corresponding to the power code.

In an embodiment, the controller may classify the operation code as any one of an operation related to the hardware function and an operation code related to the software function according to whether a corresponding function includes driving of a hardware component of a device, among the operation codes.

In an embodiment, when a plurality of devices correspond to the power code, the controller may transmit at least one of operation codes related to a specific function previously set in devices corresponding to the power code to the target device.

In an embodiment, the target device may be at least one device positioned within a preset distance from the device identifying apparatus.

In an embodiment, when a request for identifying the target device is received from at least one different terminal, the controller may transmit a result of identifying the target device as a response to the identification request, and the result of identifying the target device may include any one of pieces of identification information regarding a plurality of devices stored in the memory and information regarding a power code and at least one operation code of a device corresponding to the identification information.

According to another aspect of the present invention, a control method of a device identifying apparatus includes: sequentially transmitting a plurality of stored power codes respectively corresponding to a plurality of different devices to a target device until the target device is turned on; when the target device is turned on, identifying the target device on the basis of a power code transmitted to the target device; when a plurality of devices correspond to the transmitted power code, transmitting a plurality of operation codes corresponding to the plurality of devices to the target device; and identifying the target device on the basis of at least one operation code driving the target device among the plurality of transmitted operation codes.

MODES FOR CARRYING OUT THE PREFERRED EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Also, in describing the present invention, if a detailed explanation for a related known function or construction is considered to unnecessarily divert the gist of the present invention, such explanation has been omitted but would be understood by those skilled in the art.

Hereinafter, embodiments of the present disclosure will be described in detail with reference to the accompanying drawings.

Figure 1:
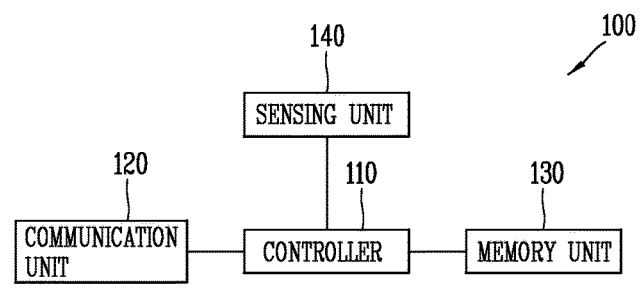
FIG. 1 is a block diagram illustrating a device identifying apparatus according to an embodiment of the present disclosure.

FIG. 1 is a block diagram illustrating a device identifying apparatus according to an embodiment of the present disclosure.

Referring to FIG. 1, a device identifying apparatus 100 according to an embodiment of the present disclosure may include a controller 110, a communication unit 120 connected to the controller 110, a sensing unit 140, and a memory unit 130. Although not shown, the device identifying apparatus 100 according to an embodiment of the present disclosure may further include a power supply unit and a optical output unit. Here, the components illustrated in FIG. 1 are not essential for implementing the device identifying apparatus 100 and the device identifying apparatus 100 described in this disclosure may have fewer or greater components.

In detail, among the components, the memory unit 130 stores data supporting various functions of the device identifying apparatus 100. The memory unit 130 may store identification information regarding each of a plurality of devices. For example, the identification information may include information regarding types or manufacturers of various devices, and the like. Also, the memory unit 130 may include information regarding a power code for turning on or off each of the plurality of devices and different operation codes regarding various functions that each of the various devices may provide.

Also, the memory unit 130 may store a plurality of application programs (or applications) driven in the device identifying apparatus 100 and data and commands for operations of the device identifying apparatus 100. At least some of the application programs may be downloaded from an external server through wireless communication. Also, at least some of the application programs may be present in the device identifying apparatus 100 from when the device identifying apparatus 100 was released for basic functions of the device identifying apparatus 100. Meanwhile, application programs may be stored in the memory unit 130 and may be installed in the device identifying apparatus 100 and driven to perform an operation (or function) of the device identifying apparatus 100 by the controller 110.

The memory unit 130 may include a storage medium such as a flash memory type, a hard disk type, a card type memory (e.g., an SD or XD memory, etc.). Also, the device identifying apparatus 100 may operate in relation to a Web storage performing a storage function of the memory unit 130 on the Internet.

Meanwhile, the controller 110 controls a general operation of the device identifying apparatus 100, in addition to operations related to the application programs. The controller 110 may process a signal, data, information, and the like, input or output through the aforementioned components or may drive an application program stored in the memory unit 130 to identify an adjacent device (target device) and provide identified information to another terminal.

To this end, the controller 110 may transmit a plurality of power codes or operation codes stored in the memory unit 130 to the target device in preset order. Also, the controller 110 may sense that the target device is turned on or the target device is driven by the power code or the operation code using various sensors provided in the sensing unit 140. Also, the controller 110 may detect a power code and at least one operation code corresponding to the target device according to the sensing result, and identify the target device on the basis of the detected power code and at least one operation code.

Meanwhile, the communication unit 120 may include one or more modules allowing for wireless communication between a wireless Internet module or the device identifying apparatus 100 and a terminal requesting identification of the target device or between the device identifying apparatus 100 and the target device 250. Also, the communication unit 120 may include one or more modules connecting the device identifying apparatus 100 to one or more networks.

For example, the communication unit 120 may include a wireless Internet module for accessing the wireless Internet or a short-range communication module for performing short-range communication. Here, the wireless Internet module may transmit and receive a wireless signal in a communication network according to wireless Internet technologies such as a wireless local area network (WLAN), wireless fidelity (Wi-Fi), long term evolution (LTE), and the like. Also, information stored in the memory unit 130 or software installed in the device identifying apparatus 100 may be updated though the wireless Internet module.

Meanwhile, the short-range communication module, used for short-range communication, may support short-range communication using at least one of technologies such as Bluetooth, Bluetooth low energy (BLE), radio frequency identification (RFID), infrared data association (IrDA), ultra wideband (UWB), ZigBee, Wi-Fi, and the like. The short-range communication module may support wireless communication between the device identifying apparatus 100 and the terminal or between the device identifying apparatus 100 and the target device.

Meanwhile, when at least one power code or operation code stored in the memory unit 130 is transmitted to the target device, the sensing unit 140 may sense whether the target device is turned on or whether the target device is driven according to the transmitted operation code. To this end, the sensing unit 140 may include various sensors such as an sound sensor, a vibration sensor, an electromagnetic field (EMF) sensor, an optical sensor, an ultrasonic sensor, an infrared sensor, a laser sensor, and the like. Also, the controller 110 may combine results sensed by at least one of the sensors to sense whether the target device is turned on or whether the target device is driven.

First, the EMF sensor, as a sensor for detecting an electromagnetic field (EMF), senses an EMF generated in the target device. When the target device is driven according to a power code or an operation code transmitted from the device identifying apparatus 100, the EMF sensor may sense driving of the target device through an electric field generated in the target device.

Meanwhile, the optical sensor is a sensor detecting an optical signal generated in the target device. When the target device is driven, the optical sensor may sense a change in a display screen provided in the target device or a change in illumination of an LED, and the like. Thus, when the target device is driven according to a power code or an operation code transmitted from the device identifying apparatus 100 and the display screen of the target device is turned on or the LED indicating an operational state of the target device is driven or changed, the optical sensor may sense that.

Meanwhile, when a specific sound signal is output from the target device or when the output sound signal is changed, the sound sensor may sense that. For example, the sound sensor may sense a beep sound or a melody generated when each of a plurality of devices is turned on or a specific function is executed, and the controller 110 may detect that the target device is turned on or a specific function is executed. To this end, the memory unit 130 may further include pieces of information related to a beep sound or a melody regarding a power code of each of the various devices and an operation of each function.

In addition, the sensing unit 140 may sense a power ON state of the target device or whether the target device is driven using a vibration sensor, an infrared sensor, an ultrasonic sensor, or a laser sensor. For example, the controller 110 may determine whether the target device 250 is driven according to whether vibration is generated in the target device 250 through the vibration sensor. Or, the controller 110 may sense whether movement has occurred in the target device or whether a position of the target device has been changed using at least one of the infrared sensor, the ultrasonic sensor, or the laser sensor.

When vibration or movement occurs in the target device or a position of the target device is changed, the controller 110 may determine that the target device is turned on or the target device is driven by the power code or the operation code.

Meanwhile, an optical output unit (not shown) may indicate various states of the device identifying apparatus 100 using at least one light source. For example, the optical output unit may indicate a remaining battery capacity, or the like, using a color of a light source, and when identifying the target device is completed, the optical output unit may indicate that identifying the target device is completed.

Meanwhile, a power input unit (not shown) may supply power required for an operation of each component upon receiving external power or internal power under the control of the controller 110. The power supply unit may include a battery, and here, the battery may be an internal battery which can be rechargeable and may be detachably coupled to a body of the device identifying apparatus 100 for the purpose of charging, or the like.

Figure 2:
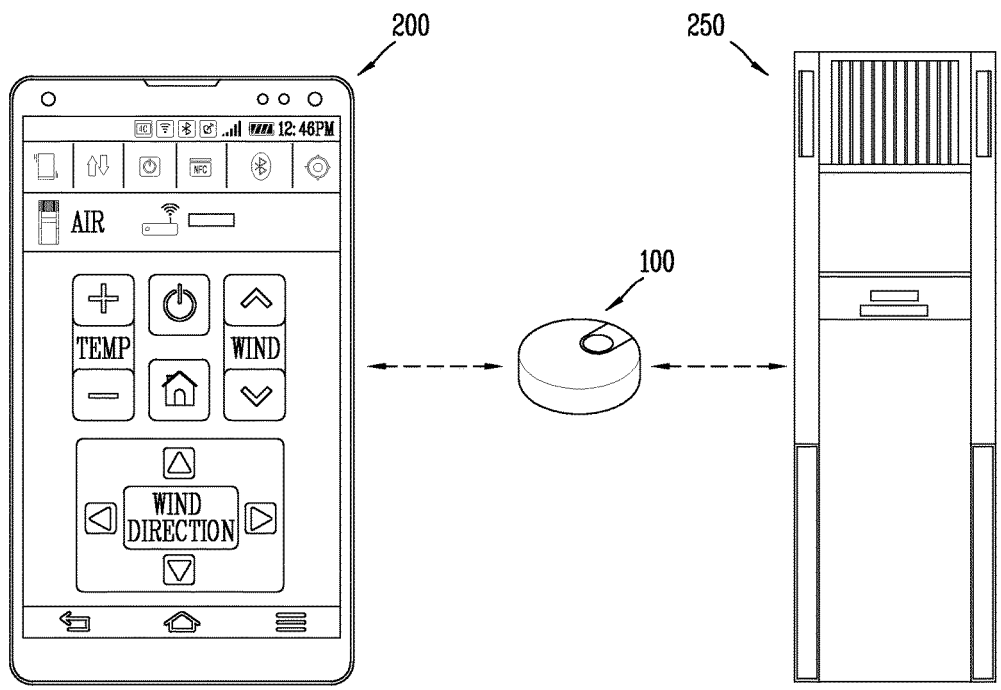
FIG. 2 is a conceptual view illustrating that a device identifying apparatus according to an embodiment of the present disclosure identifies an adjacent different device according to a request from a mobile terminal.
Figure 3:
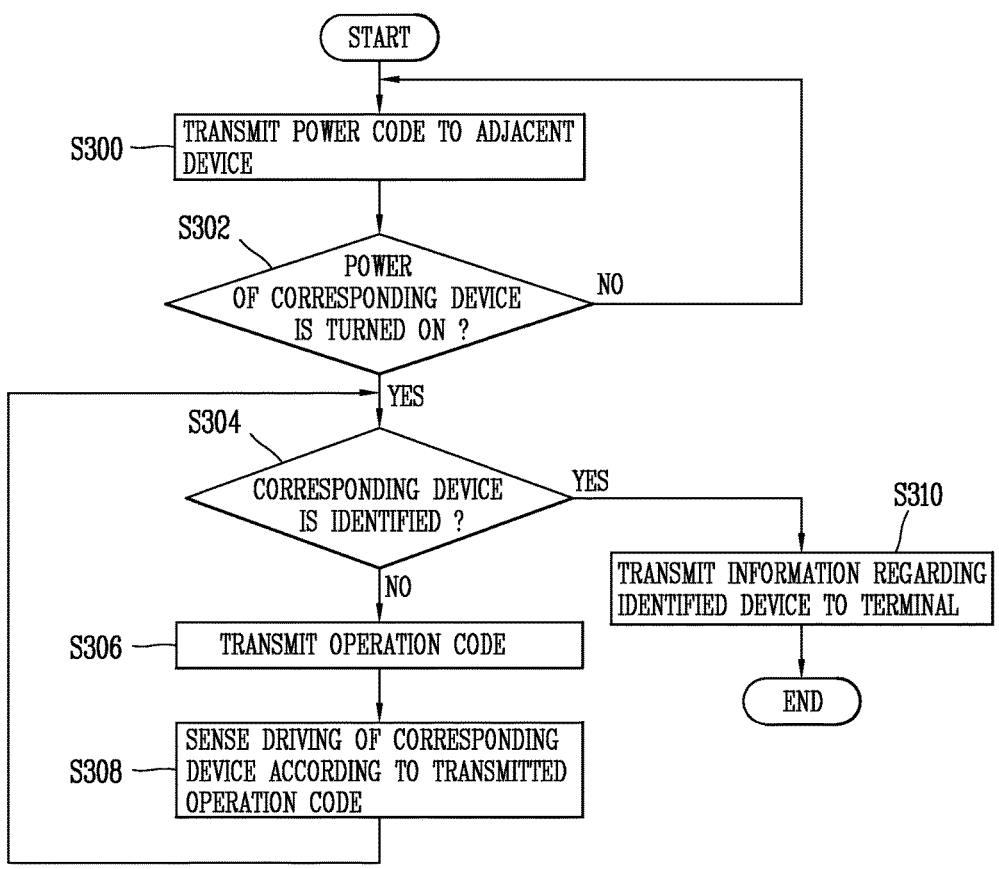
FIG. 3 is a flow chart illustrating a process in which the device identifying apparatus according to an embodiment of the present disclosure identifies an adjacent peripheral device.

FIG. 2 is a conceptual view illustrating that a device identifying apparatus according to an embodiment of the present disclosure including the aforementioned components identifies a target device according to a request from a mobile terminal. FIG. 3 is a view illustrating an operational process in which a device identifying apparatus according to an embodiment of the present disclosure identifies an adjacent target device.

First, referring to FIG. 2, the device identifying apparatus 100 may receive a request for identifying a specific device from a different terminal 200. For example, as illustrated in FIG. 2, the terminal may be a mobile terminal capable of providing a remote control function regarding a different device, and when the mobile terminal 200 does not have previously stored identification information regarding a target device 250, the mobile terminal 200 may request identification information regarding the target device 250 from the device identifying apparatus 100. In this case, the device identifying apparatus 100 according to an embodiment of the present disclosure may recognize the adjacent device as the target device 250 whose identification information has been requested by the terminal 200, and may identify the target device 250 and transmit identified information to the terminal 200.

Here, the controller 110 of the device identifying apparatus 100 according to an embodiment of the present disclosure may transmit power codes respectively stored to correspond to various devices stored in the memory unit 130 to the target device 250 (S300). This is because the target device 250 may be driven by transmitting a different operation code after the target device 250 is turned on.

In step S300, the controller 110 may transmit any one of power codes respectively corresponding to various target devices to the target device 250. Also, the controller 110 may sense a state of the target device 250 through sensors of the sensing unit 140 to detect whether the target device 250 is turned on (S302).

Meanwhile, when the target device 250 does not respond to the currently transmitted power code in step S302 (that is, when the target device 250 is not turned on), the controller 110 may return to step S300 and transmit a power code corresponding to a different device to the target device 250 and sense whether the target device 250 is turned on in step S302. This process may be repeatedly performed until the target device 250 is turned on by a transmitted power code.

However, when the target device 250 is turned on according to a detection result in S302, the controller 110 may identify the target device 250 on the basis of a power code currently transmitted to the target device 250 (S304). For example, in cases where the power code is used only in any one specific device, the controller 110 may identify the target device 250 as a device corresponding to the power code. In this case, the controller 110 may transmit identification information regarding the identified device to the terminal 200 as a response with respect to the identification request. Upon receiving the identification information, the terminal 200 may identify the target device 250 and provide a remote controller function corresponding to the identified device to the user.

Meanwhile, in cases where two or more devices correspond to the currently transmitted power code in step S304, the controller 110 may determine that the target device may not be identified by the currently transmitted power code. In such a case, the controller 110 may firstly select devices corresponding to the currently transmitted power code from among various devices whose power codes and operation codes are stored in the memory unit 130, and identify the target device 250 using operation codes respectively corresponding to functions of the firstly selected devices.

Thus, the controller 110 may select any one of the operation codes corresponding to the functions of the firstly selected devices and transmit the selected operation code to the target device 250 (S306). Also, the controller 110 may sense whether the target device 250 is driven by the currently transmitted operation code (S308). Here, the controller 110 may sense whether the target device 250 is driven using various methods (S308). For example, when an operation code is transmitted to the target device 250, the controller 110 may determine whether the target device 250 is driven by the operation code on the basis of a result of sensing at least one of a magnetic field and vibration additionally generated in the target device 250, a change in illumination of an LED generated in the target device 250 or a display screen, an audio signal, movement, a change in a position, and the like.

The controller 110 may return to step S304 to identify the target device 250. In this case, the controller 110 may identify the target device 250 according to whether the target device 250 is driven by the currently transmitted operation code. That is, when the target device 250 is driven according to the sensing result in step S308, the controller 110 may identify the target device 250 as a device corresponding to the operation code currently transmitted to the target device 250. However, when two or more devices correspond to the currently transmitted operation code, the controller 110 may repeatedly perform steps S306 to S308 and S304 to identify the target device 250.

Here, in cases where two or more devices correspond to the currently transmitted operation code, the controller 110 may secondly select the devices corresponding to the currently transmitted operation code. Also, the controller 110 may transmit any one of the operation codes corresponding to the secondly selected devices to the target device 250 in step S306. Accordingly, as steps S304 and S306 are repeated, a range of devices that can be identified as the target device 250 may continue to narrow.

Meanwhile, in the above, it is described that the target device 250 is identified on the basis of sensing results from various sensors, but the target device 250 may also be identified in a different manner. For example, when the target device 250 is able to transmit a specific signal, the controller 110 may identify the target device 250 using the specific signal.

Figure 4:
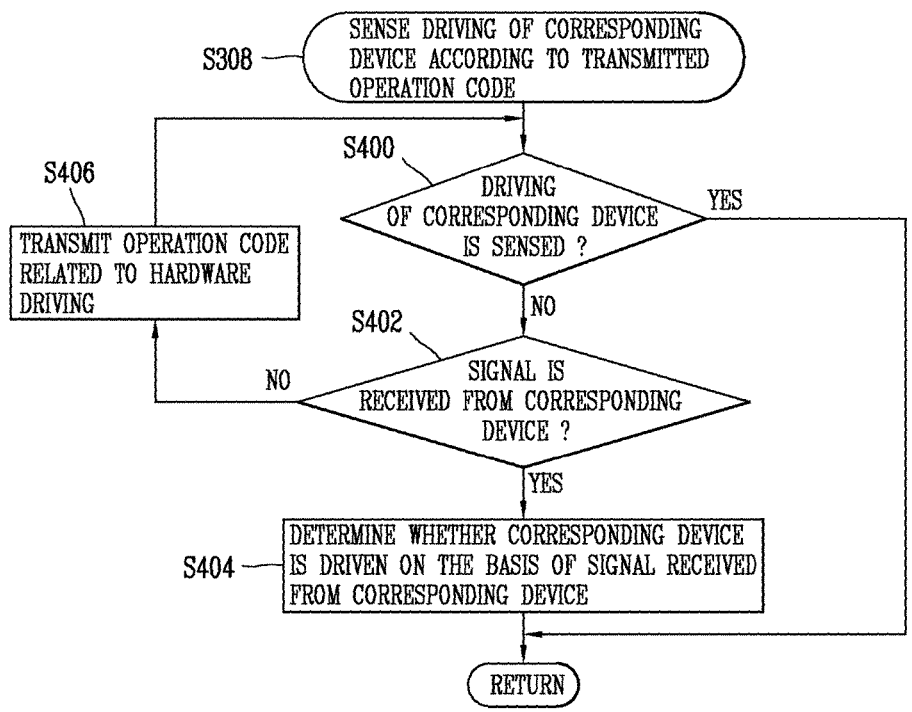
FIG. 4 is a flow chart illustrating an operation process of sensing whether a corresponding device is driven according to an operation code for identifying a device during the process of FIG. 3.

FIG. 4 is a view illustrating an operational process of sensing whether the target device is driven according to an operation code for identifying a device.

Referring to FIG. 4, when any one of the operation codes corresponding to the selected devices (e.g., the firstly or secondly selected devices), among various devices whose power codes and operation codes are stored in the memory unit 130, is transmitted to the target device 250 in step S306, the device identifying apparatus according to an embodiment of the present disclosure may sense whether the target device 250 is driven by the transmitted operation code (S400). Here, the controller 110 may sense whether the target device 250 is driven using results of sensing various sensors of the sensing unit 140.

Meanwhile, the controller 110 may sense whether the target device 250 is driven using various methods, as well as the sensing results of the sensing unit 140. For example, in cases where it is possible for the target device 250 to transmit a signal, the controller 110 may sense whether the target device 250 is driven using the signal transmitted from the target device 250. Here, in cases where driving of the target device 250 is not sensed according to the results of sensing through the sensing unit 140 in step S400, the controller 110 may detect whether a signal has been received from the target device 250 (S402)

Meanwhile, various signals may be received form the target device 250 in step S402. For example, when the target device 250 is turned on and performs a specific function by an operation code transmitted from the device identifying apparatus 100 according to an embodiment of the present disclosure, the target device 250 may output a signal indicating a currently performed function or a signal indicating that the target device is currently being driven. Here, upon receiving the signal output from the target device 250, the controller 110 may sense that the target device 250 is driven by the transmitted operation code (S404).

Or, when an operation code is transmitted from the device identifying apparatus 100, the target device 250 may detect whether one of preset operation codes thereof matches the transmitted operation code, and output a signal including a corresponding result. In this case, the controller 110 may receive the signal output from the target device 250, and determine whether the target device 250 is driven according to whether an operation code of the target device 250 matches the currently transmitted operation code (S404).

Meanwhile, when no signal is received from the target device 250 in step S402, the controller 110 may determine whether the target device 250 is driven in a different manner. For example, the controller 110 may classify currently stored operation codes into operation codes related to a software function and operation codes related to a hardware function. Here, the software function may refer to a function which may be performed simply through an electrical operation without driving a hardware component such as changing an operation mode (e.g., a display mode) or changing a volume. Meanwhile, the hardware function may refer to a function performed to include driving of a hardware component such as a motor, or the like, such as changing a direction of wind, moving a position, or changing a state of a component that can be opened and closed.

In this case, the controller 110 may select an operation code related to a hardware function from among operation codes corresponding to currently selected devices. Also, the controller 110 may transmit the selected operation code to the target device 250. In this case, when a function matched to the operation code has been previously set in the target device 250, the target device 250 may perform a hardware function by the operation code. In this case, the target device 250 may be changed in position by the hardware function (e.g., when the target device 20 is a robot cleaner) or may be changed in a direction of wind (when the target device 250 is an air-conditioner or an electric fan) according to driving of a hardware function, and thus, the device identifying apparatus 100 according to an embodiment of the present disclosure may sense whether the target device 250 is driven using that.

Meanwhile, when a device does not perform a hardware function like the currently selected devices (e.g., the firstly or secondly selected devices), the controller 110 may transmit an operation code related to a preset specific function to each of the selected devices. For example, in cases where the firstly or secondly selected device does not support a hardware function such as a TV or an audio player, the controller 110 may transmit an operation code regarding a preset function by an operation code to be transmitted to the selected devices.

That is, for example, when the selected devices include a device having a display unit such as a TV, the controller 110 may transmit an operation code regarding a function for turning off a screen of the device. Also, when a screen of the target device 250 is turned off, the controller 110 may sense that the target device 250 has been driven by the transmitted operation code through a sensor (e.g., an illumination sensor) provided in the sensing unit 140 in step S400.

Also, when the currently selected devices include a device not including a display unit like an audio player, the controller 110 may transmit an operation code regarding a function for adjusting a volume of the device. In this case, the controller 110 may sense a change in a magnitude of the audio signal through a sensor (for example, a sound sensor) provided in the sensing unit 140 in step S400, and thus, the controller 110 may sense that the target device 250 is driven by the transmitted operation code.

In the above, the operation of identifying various devices by the device identifying apparatus 100 according to an embodiment of the present disclosure has been described in detail through the flow chart.

Hereinafter, an example in which the device identifying apparatus 100 according to an embodiment of the present disclosure identifies a target device according to the aforementioned operation process will be described with reference to the accompanying drawings.

Figure 5A:
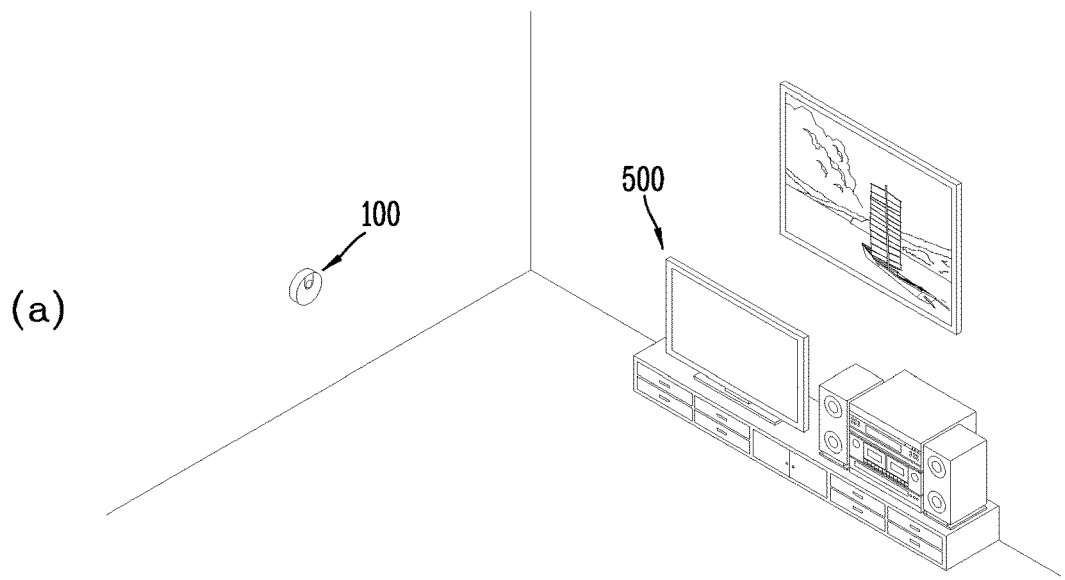
FIGS. 5A to 5C are views illustrating an example in which a device identifying apparatus according to an embodiment of the present disclosure identifies a target device.
Figure 5A:
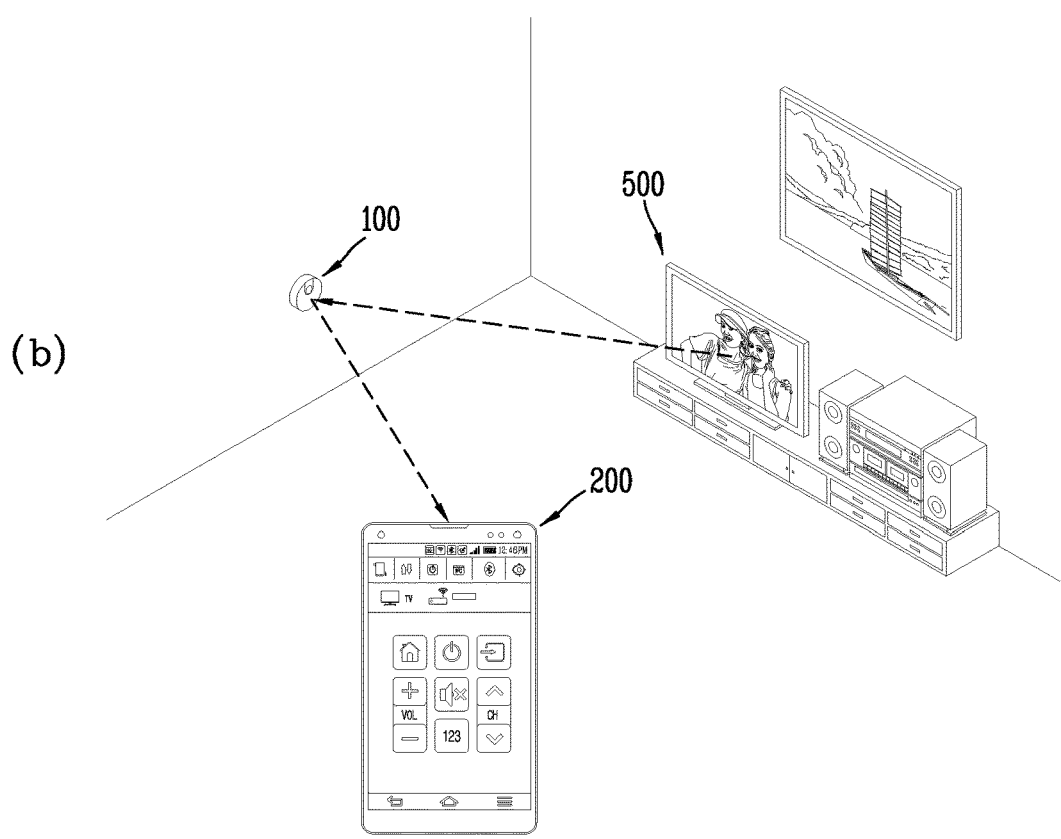
Figure 5B:
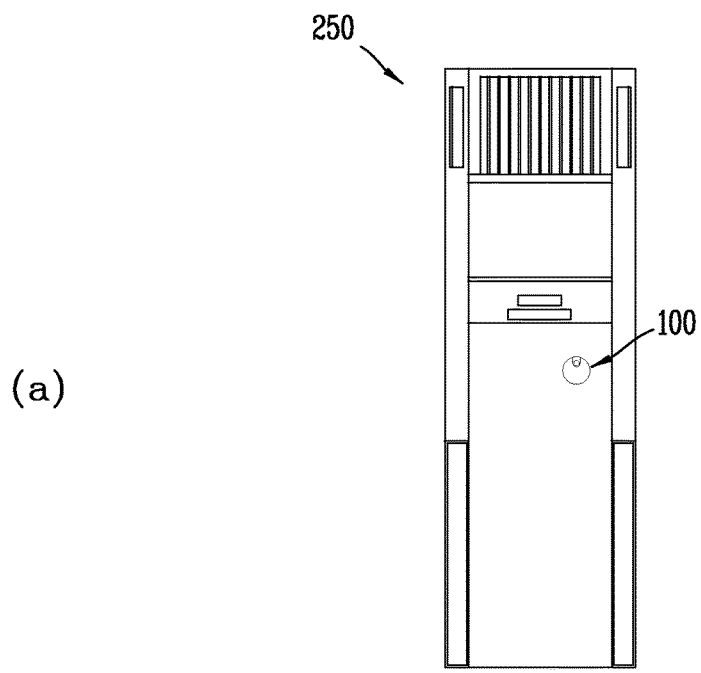
Figure 5B:
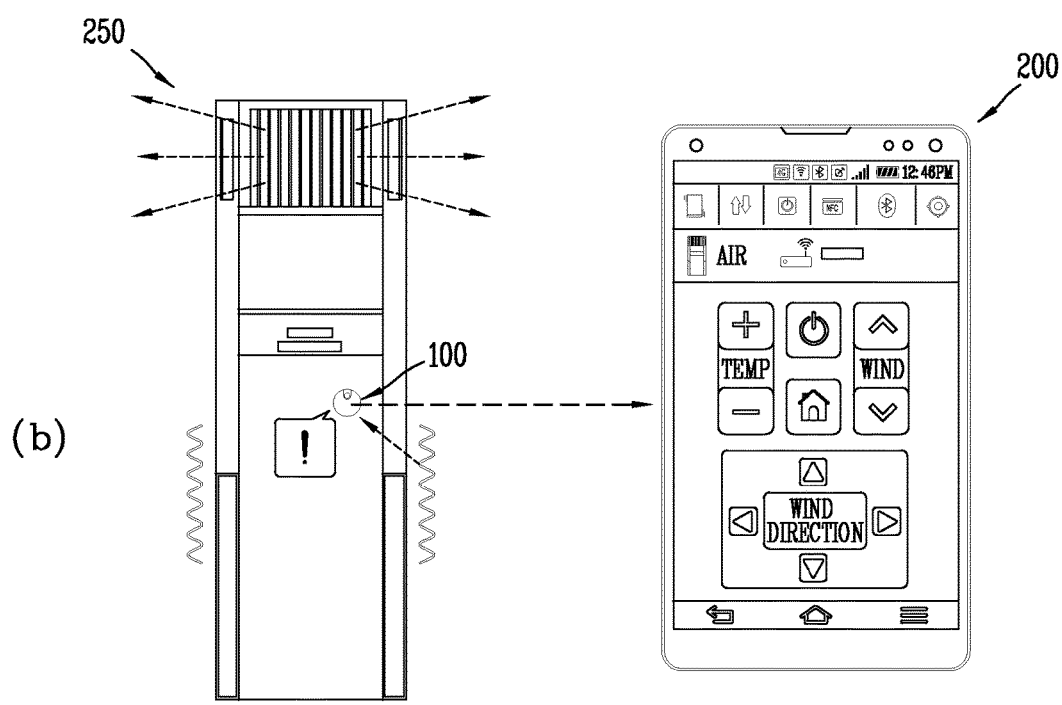
Figure 5C:
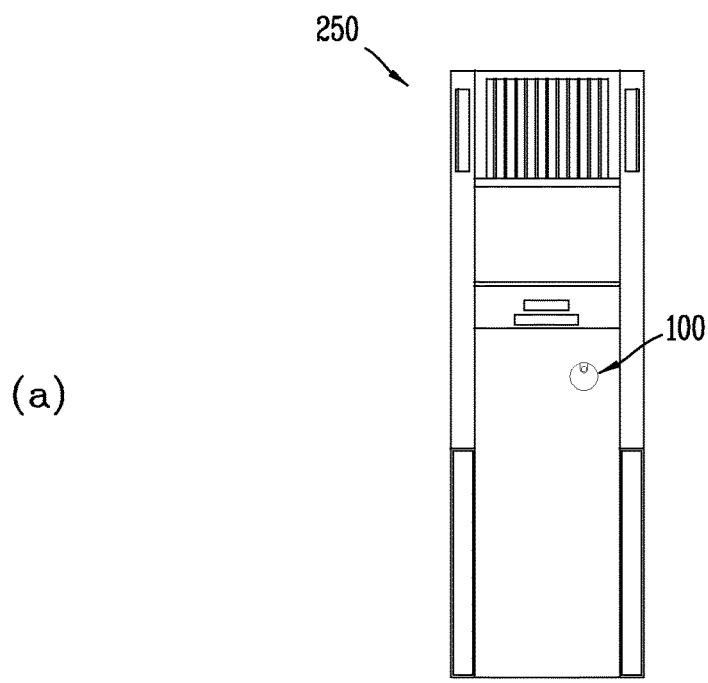
Figure 5C:
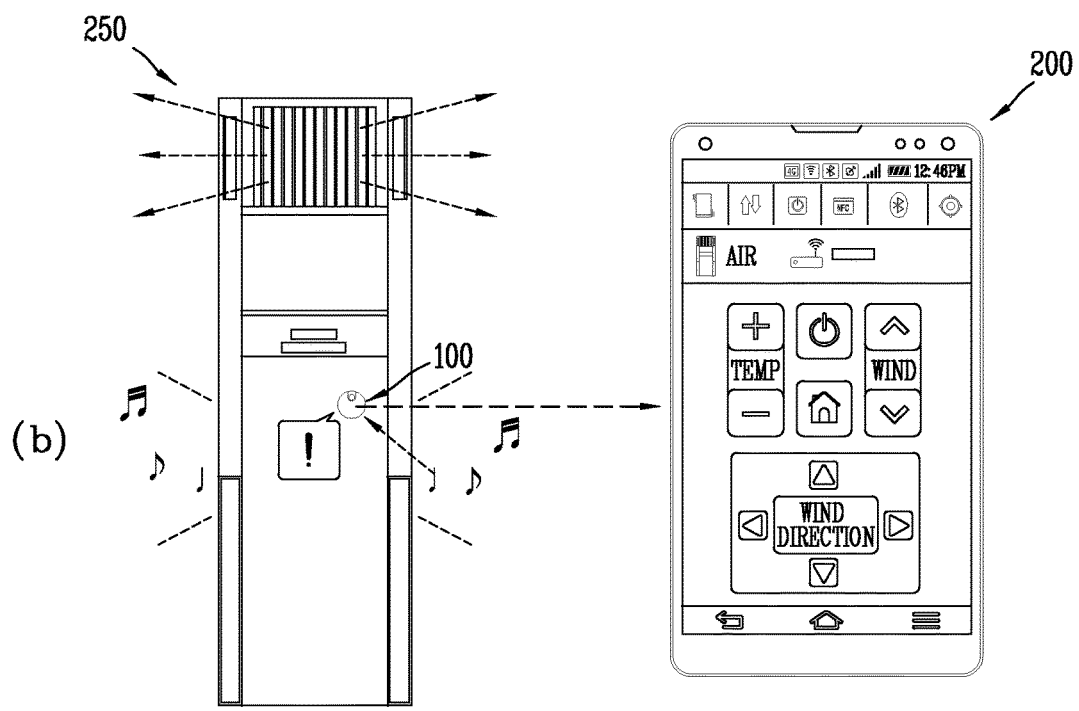

FIGS. 5A to 5C are views illustrating examples of identifying a target device by a device identifying apparatus according to an embodiment of the present disclosure.

First, FIG. 5A illustrates an example in which the device identifying apparatus 100 according to an embodiment of the present disclosure identifies a target device on the basis of a sensing result through an optical sensor.

Referring to FIG. 5A, (a) of FIG. 5A illustrates an example in which the device identifying apparatus 100 according to an embodiment of the present disclosure is attached. In this case, the device identifying apparatus 100 may identify a target device upon receiving a corresponding request. Also, the target device may be a TV, or the like, as illustrated in (a) of FIG. 5A. Hereinafter, it is assumed that the target device is the TV.

Here, the device identifying apparatus 100 according to an embodiment of the present disclosure may sequentially transmit a plurality of previously stored power codes to the target device (TV) 500 respectively corresponding to different devices. Here, when the power code is a preset power code, a controller of the TV 500 may turn on power and indicate a state in which power is driven through an LED, or the like.

In this case, the device identifying apparatus 100 may sense a state in which the LED is turned on through the optical sensor, and accordingly, the device identifying apparatus 100 may firstly identify the TV 500 on the basis of the power code currently transmitted to the TV 500.

In this case, in cases where only one device corresponds to the power code, the controller 110 may immediately identify the TV 500 as a device corresponding to the power code. However, referring to (b) of FIG. 5A, when two or more devices correspond to the power code, the controller 110 may identify the TV 500 using operation codes respectively set to the devices corresponding to the power code.

In this case, the controller 110 may sequentially transmit the operation codes one by one to sense whether the TV 500 is driven by the operation codes. Here, the operation codes may be related to a function of displaying image information on the TV 500. Here, the controller 110 may sense a change in a display unit of the TV 500 through the optical sensor of the sensing unit 140 and determine whether the TV 500 is driven using the sensed change. Also, the controller 110 may identify the TV 500 according to an operation code driving the TV 500 among the operation codes. FIG. 5B illustrates an example of the case.

Meanwhile, the device identifying apparatus 100 according to an embodiment of the present disclosure may sense a driving state of a target device in various manners. For example, the device identifying apparatus 100 may determine whether the target device is turned on or whether the target device is driven, by vibration, electromagnetic waves, a sound, and the like, from the target device.

FIG. 5B illustrates an example in which the device identifying apparatus 100 according to an embodiment of the present disclosure senses a power ON state or driving of a target device on the basis of vibration or an electromagnetic wave generated by the target device.

For example, as illustrated in (a) of FIG. 5B, the device identifying apparatus 100 may be attached to a target device and driven. This is because, as a distance between a target device and the device identifying apparatus 100 is smaller, vibration or electromagnetic waves generated by the target device may be more accurately sensed. However, the present disclosure is not limited thereto and the device identifying apparatus 100 may operate in a position spaced apart from a target device by a predetermined distance according to performance of the sensor of the sensing unit 140.

When the target device is driven as illustrated in (a) of FIG. 5B, the controller 110 of the device identifying apparatus 100 may sequentially transmit power codes and operation codes to the target device (air-conditioner 250) according to a corresponding request from the terminal 200, and sense vibration or electromagnetic waves generated by the target device 250. For example, in a state in which vibration or electromagnetic waves are not present or so insignificant as to be determined not to be present, when vibration or electromagnetic waves of a predetermined level or higher are generated, the controller 110 may sense that the target device 250 is turned on.

Also, when vibration or electromagnetic waves of a predetermined level or higher are generated again and the generated vibration of electromagnetic waves are increased to be higher than the predetermined level, the controller 110 may determine that a function according to a transmitted operation code is driven in the device identifying apparatus 100. Also, as described above, the controller 110 may identify the target device 250 on the basis of the transmitted power code or on the basis of the power code and at least one operation code. (b) of FIG. 5B illustrates an example thereof.

Meanwhile, similarly, the device identifying apparatus 100 according to an embodiment of the present disclosure may sense a state in which the target device 250 is turned on or a state in which a function of the target device 250 is driven using a sound generated by the target device. in this case, the controller 110 may sense the state using a sound sensor or using various melodies previously stored in the memory unit 130. That is, in cases where the target device is turned on, the controller 110 may transmit operation codes to the turned-on device. Also, when the controller 110 senses a sound signal, i.e., a melody sound corresponding to a specific function, generated in the target device, the controller 110 may sense that the target device 250 is driven on the basis of the currently transmitted operation code. (a) and (b) of FIG. 5C illustrate an example of identifying the target device on the basis of a sound generated by the target device.

Meanwhile, here, the controller 110 may also identify the target device 250 by comparing the generated melody sound with various melody sounds previously stored in the memory unit 130. Also, the controller 110 may filter noise signals from sound signals using a noise canceling filter.

Meanwhile, in the above descriptions related to FIGS. 5A to 5C, a case in which the device identifying apparatus 100 according to an embodiment of the present disclosure senses a power ON state or an operation driving state of the target device using only any one of an optical signal vibration, electromagnetic waves, and a sound signal generated by the target device is described as an example, but the device identifying apparatus 100 may also sense a state of the target device using a plurality of signals generated by the target device. That is, for example, the device identifying apparatus 100 according to an embodiment of the present disclosure may sense whether the target device is turned on using electromagnetic waves or vibration, and determine whether the target device reacts to the transmitted operation code, that is, whether the target device is driven, using a sound signal or a light signal generated by the target device.

Meanwhile, in the above, the case in which light, a sound, vibration, and electromagnetic waves generated by the target device are sensed is described as an example, but the controller 110 may also identify the target device using a signal transmitted from the target device. For example, in response to the power code or the operation code of the device identifying apparatus 100, the target device may transmit a signal indicating that the target device is turned on or a signal indicating the target device is driven to the outside, instead of being actually driven. In this case, the controller 110 may receive the signal through the communication unit 120 and determine whether the target device is turned on or whether the target device is driven from the received signal.

Meanwhile, in the above, the case in which the device identifying apparatus 100 according to an embodiment of the present disclosure identifies only any one target device 250 and transmits the identified result to the terminal 200 is described as an example, but the present disclosure is not limited thereto. That is, when a plurality of adjacent devices are present, the plurality of devices may be identified, and when the devices are identified, identification information of the devices may be transmitted to the terminal 200.

Figure 6:
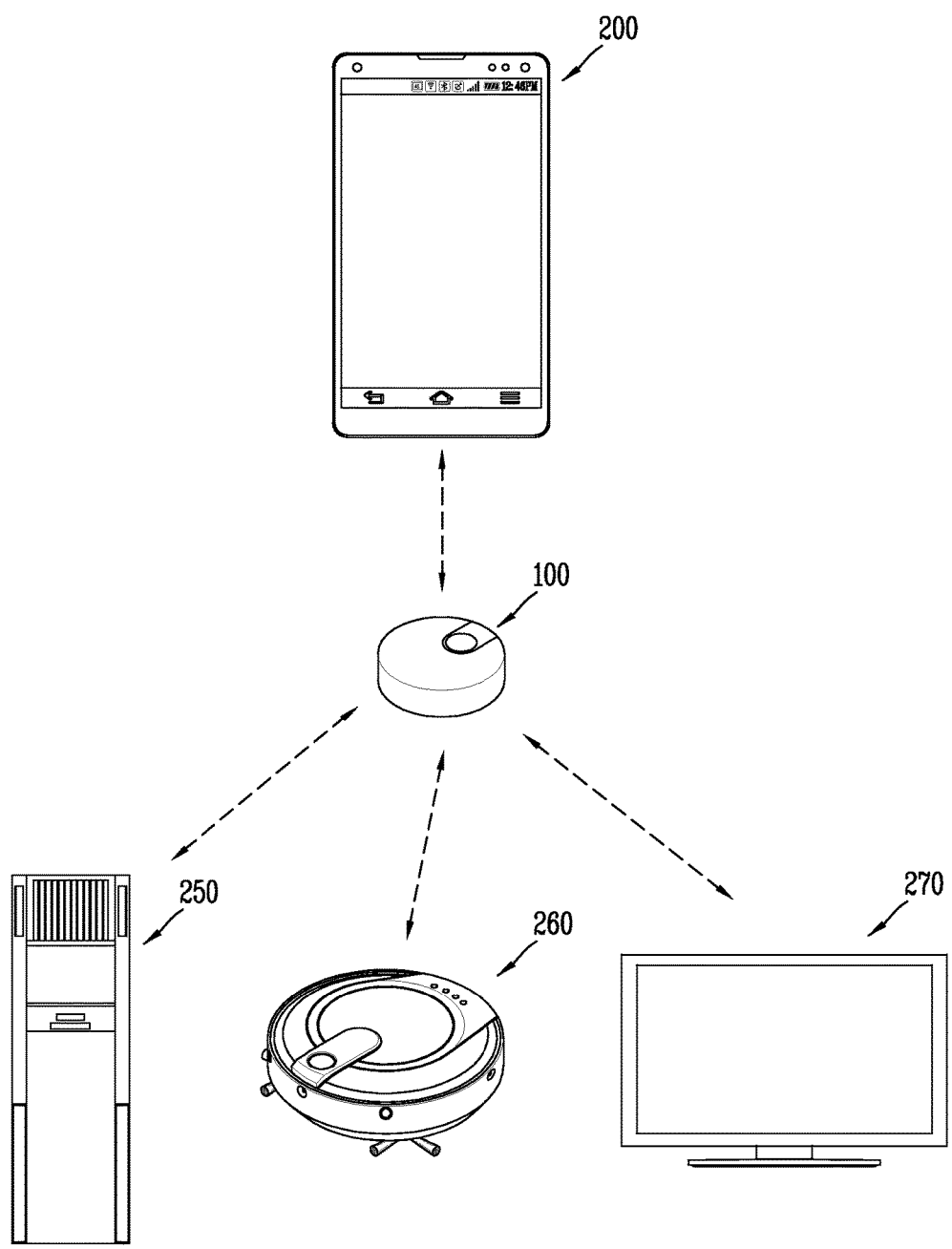
FIG. 6 is a view illustrating an example in which a device identifying apparatus according to an embodiment of the present disclosure identifies a plurality of adjacent peripheral devices.

FIG. 6 is a view illustrating an example in which the device identifying apparatus 100 according to an embodiment of the present disclosure identifies a plurality of adjacent peripheral devices.

Referring to FIG. 6, when a request for identifying a device is received from the terminal 200, the device identifying apparatus 100 according to an embodiment of the present disclosure may identify adjacent peripheral devices 250, 260, and 270. Here, the device identifying apparatus 100 according to an embodiment of the present disclosure may identify each of the devices 250, 260, and 270 one by one through the processes illustrated in FIGS. 3 and 4.

When identifying the peripheral devices 250, 260, and 270 is completed, the device identifying apparatus 100 according to an embodiment of the present disclosure may transmit identification information of each of the peripheral devices 250, 260, and 270 to the terminal 200. In this case, the terminal 200 may receive identification information regarding all of the peripheral devices 250, 260, and 270, and provide a remote controller function regarding each of the peripheral devices 250, 260, and 270 to the user. Here, when any one of the peripheral devices 250, 260, and 270 has already been identified, the controller 110 may not identify the device again.

The device identifying apparatus and a method for controlling the same according to embodiments of the present disclosure have the following advantages.

According to at least one of embodiments of the present disclosure, when a request for identification information is received from a terminal, an adjacent device is identified and information regarding the identified device is transmitted to the terminal which has transmitted the request for the identification information, whereby the mobile terminal may identify the target device and the user may remotely operate the target device through the mobile terminal.

Also, according to at least one of embodiments of the present disclosure, when since identification information regarding an identified device and information related to an operation code are provided together to a terminal which has transmitted a request for identification information, even in cases where there is no information regarding the target device in the mobile terminal, the user may remotely operate the target device through the mobile terminal.

The specific embodiments of the present disclosure have been described, the embodiments may also be modified without departing from the scope of the present invention. in particular, in an embodiment, transmission of identification information is described as an example, but information regarding various codes, that is, a power code, or operation codes, regarding an identified device may also be transmitted together. In this case, although the terminal 200 does not have information regarding a currently identified device, the terminal 200 may provide a remote control function regarding the currently identified device to the user.

Although a few exemplary embodiments have been shown and described, it will be appreciated by those skilled in the art that changes may be made in these exemplary embodiments without departing from the principles and spirit of the invention, the range of which is defined in the appended claims and their equivalents. Accordingly, the exemplary embodiments of the present invention are provided to explain the technical spirit of the present invention but not to limit such spirit. The scope of the technical spirit of the present invention is not limited by the exemplary embodiments of the present invention. The scope of protection of the present invention should be interpreted by the claims below, and all technical spirits which are in the same scope would be interpreted as being included in the scope of right of the present invention.

The invention claimed is:

1. A device identifying apparatus comprising:
a memory storing a plurality of power codes and operation codes, each power code and each operation code corresponding to a respective one of a plurality of different devices;
a communication unit transmitting at least one of the power code and the operation code to at least one target device among the plurality of different devices;
a sensing unit sensing a change in a state of the at least one target device which has received the at least one of the power code or the operation code; and
a controller configured to:
cause the communication unit to transmit a power code among the plurality of power codes to the at least one target device, wherein the plurality of power codes are transmitted one by one until a target device is turned on in response to the transmitted power code;
identify a single specific device among the plurality of different devices as a first target device corresponding to the transmitted power code when only the single specific device is turned on in response to the transmitted power code;
cause the communication unit to transmit operation codes among the plurality of operation codes one by one to more than one device among the plurality of different devices when the more than one device are turned on in response to the transmitted power code, wherein no operation code is transmitted to the single specific device that is identified as the target device by its correspondence to the power code; and
identify one of the more than one device corresponding to the transmitted power code as a second target device when the one of the more than one device is driven according to a corresponding one of the transmitted operation codes.

2. The device identifying apparatus of claim 1, wherein the controller is further configured to:
receive, via the communication unit, a signal output from the second target device in response to the corresponding operation code that is currently transmitted; and
determine whether the second target device is driven by the currently transmitted operation code based on the received signal.

3. The device identifying apparatus of claim 2, wherein the signal received from the second target device is a signal indicating that the second target device is currently driven according to the currently transmitted operation code.

4. The device identifying apparatus of claim 3, wherein when the operation code is transmitted to the second target device, the controller is further configured to sense at least one of electromagnetic waves generated by the second target device, an LED provided in the second target device, or a change in image information displayed on a display unit, a sound, or movement of the second target device to determine whether the second target device is driven by the operation code.

5. The device identifying apparatus of claim 2, wherein the signal received from the second target device is a signal indicating whether the currently transmitted operation code matches an operation code previously set in the second target device.

6. The device identifying apparatus of claim 1, wherein:
the sensing unit includes at least one of an electromagnetic field (EMF) sensor, a sound sensor, an optical sensor, a vibration sensor, or a motion sensor; and
when the power code is transmitted to the first or second target device, the controller is further configured to determine whether the first or second target device is turned on based on at least one of electromagnetic waves generated by the first or second target device, an LED provided in the first or second target device, image information displayed on a display unit of the first or second target device, or movement of the first or second target device.

7. The device identifying apparatus of claim 1, wherein when the more than one device are turned on, the controller is further configured to cause the communication unit to sequentially transmit to the more than one device operation codes corresponding to functions of the more than one device corresponding to the transmitted power code among the plurality of operation codes stored in the memory.

8. The device identifying apparatus of claim 7, wherein when the first target device is turned on and there is no other devices corresponding to the transmitted power code, the controller is further configured to identify the first target device as a device corresponding to the transmitted power code.

9. The device identifying apparatus of claim 1, wherein when the second target device is driven by the transmitted operation code, the controller is further configured to cause the communication unit to transmit to the more than one device, excluding the second target device, different operation codes among the plurality of operation codes stored in the memory.

10. The device identifying apparatus of claim 9, wherein when driving of the second target device is sensed in response to a first transmitted operation code and there is no other device corresponding to the transmitted first operation code, the controller is further configured to identify the second target device as a device corresponding to the first transmitted operation code.

11. The device identifying apparatus of claim 1, wherein:
the controller is further configured to classify the plurality of operation codes stored in the memory into operation codes related to a software function and operation codes related to a hardware function; and
when the more than one device correspond to the transmitted power code, the controller is further configured to cause the communication unit to transmit to the more than one device at least one of the operation codes related to the hardware function and corresponding to the transmitted power code.

12. The device identifying apparatus of claim 11, wherein the controller is further configured to classify the at least one operation code among the plurality of operation codes as any one of an operation related to the hardware function and an operation code related to the software function according to whether a corresponding function includes driving of a hardware component of a corresponding device.

13. The device identifying apparatus of claim 1, wherein when the more than one device correspond to the power code, the controller is further configured to cause the communication unit to transmit at least one of operation codes related to a specific function previously set in the more than one device corresponding to the power code to the second target device.

14. The device identifying apparatus of claim 1, wherein the first or second target device is positioned within a preset distance from the device identifying apparatus.

15. The device identifying apparatus of claim 1, wherein:
the controller is further configured to:
receive, via the communication unit, a request for identifying a target device from a mobile terminal; and
cause the communication unit to transmit a result of identifying the first or second target device to the mobile terminal in response to the request; and
the result of identifying the first or second target device includes any one of pieces of identification information regarding the plurality of devices stored in the memory and information regarding a power code and at least one operation code of a device corresponding to the identification information.

16. The device identifying apparatus of claim 1, wherein the transmitted operation code is related to at least one function of the more than one device.

17. The device identifying apparatus of claim 1, wherein the device identifying apparatus is attached to the first or second target device.

18. The device identifying apparatus of claim 1, wherein the device identifying apparatus is spaced apart from the first or second target device by a distance that is greater than 0.

19. The device identifying apparatus of claim 1, wherein:
the operation codes are transmitted one by one until the second target device is identified among the more than one device corresponding to the transmitted power code; and
no more operation codes are transmitted after the second target device is identified.

20. A control method of a device identifying apparatus, the control method comprising:
storing a plurality of power codes and operation codes in a memory, each power code and each operation code corresponding to a respective one of a plurality of different devices;
transmitting a power code among the plurality of stored power codes to at least one target device, wherein the plurality of power codes are transmitted one by one until a target device is turned on in response to the transmitted power code;
identifying a single specific device among the plurality of different devices as a first target device corresponding to the transmitted power code when only the single specific device is turned on in response to the transmitted power code;
transmitting operation codes among the plurality of operation codes one by one to more than one device among the plurality of different devices when the more than one device are turned on in response to the transmitted power code, wherein no operation code is transmitted to the single specific device that is identified as the target device by its correspondence to the power code; and
identifying one of the more than one device corresponding to the transmitted power code as a second target device when the one of the more than one device is driven according to a corresponding one of the transmitted operation codes.

* * * * *